United States Patent
Derryberry et al.

(10) Patent No.: US 7,499,474 B2
(45) Date of Patent: Mar. 3, 2009

(54) EFFICIENT HARQ CONTROL AND CHANNEL QUALITY FEEDBACK REPORTING FOR MULTICARRIER SYSTEMS

(75) Inventors: R. Thomas Derryberry, Plano, TX (US); Adrian Boariu, Irving, TX (US); Zhigang Rong, San Diego, CA (US)

(73) Assignee: Nokia Corporation, Espoo (FI)

( * ) Notice: Subject to any disclaimer, the term of this patent is extended or adjusted under 35 U.S.C. 154(b) by 156 days.

(21) Appl. No.: 11/105,768

(22) Filed: Apr. 13, 2005

(65) Prior Publication Data

US 2006/0233127 A1    Oct. 19, 2006

(51) Int. Cl.
*H04J 9/00* (2006.01)
(52) U.S. Cl. ...................... 370/538; 370/333
(58) Field of Classification Search ................. 370/537, 370/538, 332, 333
See application file for complete search history.

(56) References Cited

U.S. PATENT DOCUMENTS

| | | | |
|---|---|---|---|
| 7,047,473 B2* | 5/2006 | Hwang et al. | 714/751 |
| 2003/0137955 A1* | 7/2003 | Kim et al. | 370/332 |
| 2004/0137896 A1 | 7/2004 | Sarkar et al. | 455/423 |
| 2004/0141466 A1* | 7/2004 | Kim et al. | 370/252 |
| 2005/0207367 A1* | 9/2005 | Onggosanusi et al. | 370/315 |

OTHER PUBLICATIONS

"Advantages of CDMA2000", internet article, www.cdg.org/technology/3g/advantages_cdma2000.asp, Sep. 1, 2004, 5 pgs.
"Technical Overview of 1xEV-DV White Paper", © 2002 Motorola, Inc., Sep. 18, 2002, 24 pgs.
"Physical Layer Standard for cdma2000 Spread Spectrum Systems, Release C", 3GPP2 C.S0002-C, Version 1.0, May 28, 2002, 505 pgs.
Derryberry, R.T. et al., "Overview of cdma2000® Revision D", 3 pgs.
Agrawal, A., "3$^{rd}$ Generation CDMA Wireless Systems", Qualcomm, Jan. 5, 2000, 31 pgs.
Brouwer, A.E. et al., "An Updated Table of Minimum-Distance Bounds for Binary Linear Codes", © 1993 IEEE, 16 pgs.
Control Channel Design for High Speed Downlink Shared Channel for 3GPP W-CDMA, Rel-5, A. Ghosh et al., Vehicular Technology Conference, 2003, VTC 2003-Spring. The 57$^{th}$ IEEE Semiannual, vol. 3, pp. 2085-2089, Apr. 2003.
"Physical Layer Standard for cdma2000 Spread Spectrum Systems—Revision 3", 3GPP2 Standard C.S0002-C Physical Layer Standard for cdma2000 Spread Spectrum Revision C. Version 2.0, Jul. 2004.

* cited by examiner

*Primary Examiner*—Edward Urban
*Assistant Examiner*—Adeel Haroon
(74) *Attorney, Agent, or Firm*—Harrington & Smith, PC (57) ABSTRACT

A method comprising receiving a plurality of data packets each associated with one of a plurality of carriers, deriving an input bit stream indicative of the receipt of the plurality of data packets, utilizing an output block code to convert the input bit stream into an output bit stream, and transmitting the output bit stream to at least one of the plurality of carriers.

33 Claims, 8 Drawing Sheets

EFFICIENT HARQ CONTROL AND CHANNEL QUALITY FEEDBACK REPORTING FOR MULTICARRIER SYSTEMS

BACKGROUND

1. Field

Embodiments of the invention relate to a method, apparatus, and computer program product for efficiently communicating feedback in wireless communication systems, and, more particularly, to a code based form of communication between a single mobile station and multiple carriers, such as may operate in a cdma2000 system or similar systems.

2. Brief Description of Prior Developments

3×EV-DV represents an extension of the single carrier 1×EV-DV standard to a standard wherein a single mobile station (MS) can be in simultaneous communication with one, two, or three carriers. One advantageous attribute of 1×EV-DV's robust high-speed downlink data transmission is its ability to dynamically schedule users as a function of the user's received channel quality. In a 1×EV-DV system, each mobile station is in contact with, at most, one carrier at a time. As a result, it is necessary to provide for the acknowledgement/non-acknowledgement of only one received packet at a time.

The multicarrier extension of 1×EV-DV to 3×EV-DV requires the ability of each MS to acknowledge/non-acknowledge (ACK/NAK), via the reverse acknowledgement channel (R-ACKCH), up to three received packets simultaneously.

Figure 1:
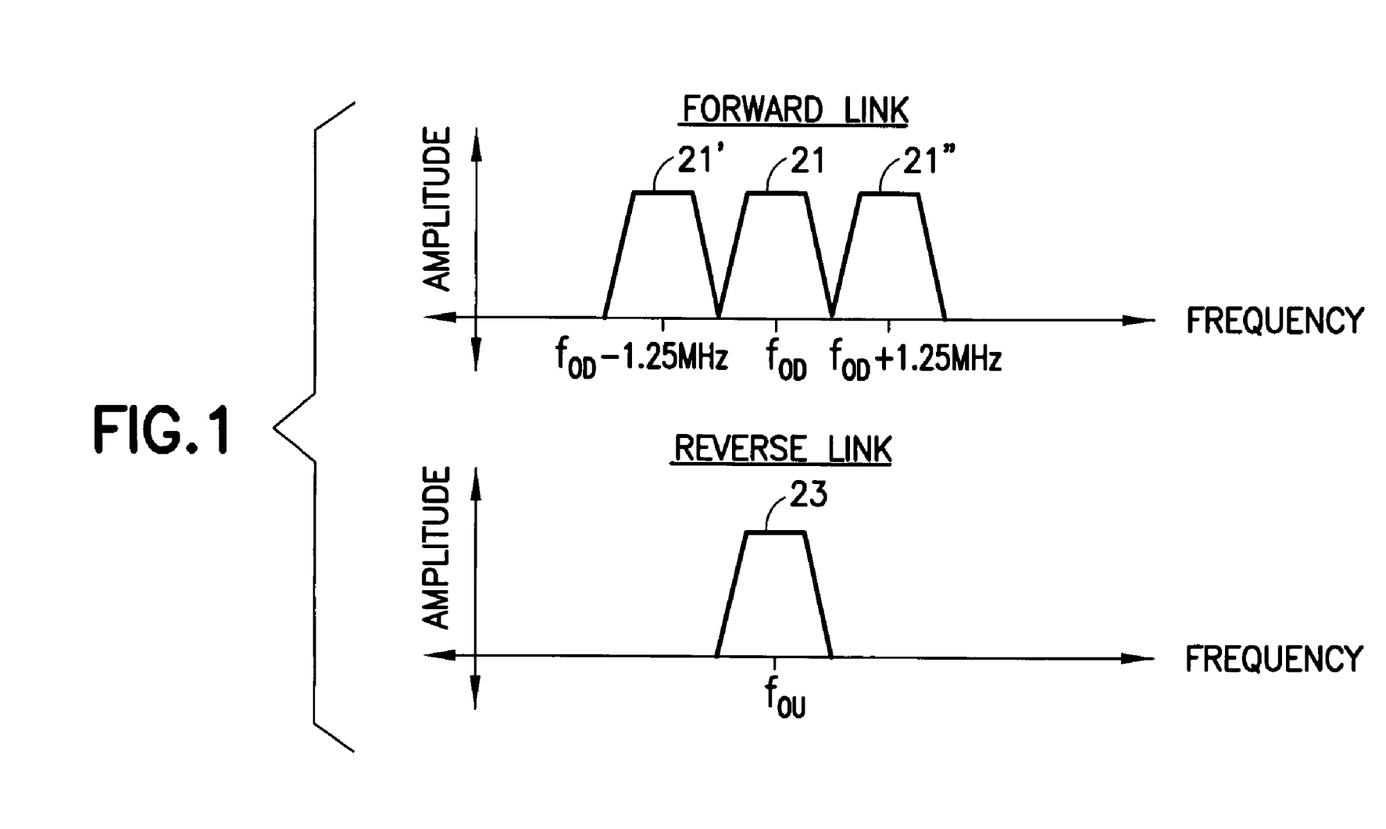
FIG. 1 is a diagram of the spectral relationship between the forward and reverse links in a 3×EV-DV system.

With reference to FIG. 1, there is illustrated a representative scenario for the spectral relationships of the forward and reverse links of 3×EV-DV used by three nodes and a mobile station. The forward link component of 3×EV-DV is shown in exemplary fashion as employing three forward link spectra 21, 21', 21" for forward communication from a node such as a base station to a MS. Each forward link spectrum 21, 21', 21" is generally symmetric about a downlink frequency. As used herein, a node may be a base station, another MS, a LAN gateway, or any other transceiving entity within a wireless network that communicates with the MS. Where an entity transmits over multiple antennas, each antenna is considered a node.

In the instance illustrated, the downlink frequencies consist of a central downlink frequency $f_{OD}$, and two additional downlink frequencies disposed on either side of $f_{OD}$, at a distance of approximately 1.25 MHz. For the purposes of this description, it is assumed, but not required, that the three downlink spectral bands 21, 21', 21" are adjacent. In addition, there is shown a 1×EV-DV reverse link consisting of a reverse link spectrum 23 centered on an uplink frequency $f_{OU}$.

As is evident, the operational bandwidths across the entire forward link are not symmetric with the reverse link. When seeking to extend the existing 1×EV-DV system to the multicarrier 3×EV-DV system, it would appear at first glance that one might simply linearly extend the 1×EV-DV model by a factor of three. However, it is not desirable to simply triple the reverse link overhead, since the additional reverse link bandwidth would be largely wasted.

What is therefore needed is a method of transmitting received channel quality information over a reverse link from a mobile station to another node in a 3×EV-DV system that does not require a significant increase in transmission overhead beyond that which is required for 1×EV-DV. Preferably, such a method would preserve compatibility with preexisting 1×EV-DV systems. In addition, such a methodology should be extendable to providing for the transmission of multiple data streams from a MS to one or more carriers, such as data streams used to transmit signal quality information. Further, such a technique would minimize, to the extent possible, impact to existing reverse link protocol.

SUMMARY

In accordance with one aspect of the present invention, a method is provided comprising receiving a plurality of data packets each associated with one of a plurality of carriers, deriving an input bit stream indicative of the receipt of the plurality of data packets, utilizing an output block code to convert the input bit stream into an output bit stream, and transmitting the output bit stream to at least one of the plurality of carriers.

In accordance with another aspect of the present invention, a multi-carrier wireless communication system comprises a plurality of carriers each transmitting a plurality of data packets, and a mobile station in communication with each of the plurality of carriers for receiving the plurality of data packets, deriving an input bit stream from the plurality of received data packets, utilizing an output block code to convert the input bit stream into an output bit stream, and transmitting the output bit stream to the plurality of carriers.

In accordance with another aspect of the present invention, a program of machine-readable instructions, tangibly embodied on an information bearing medium and executable by a digital data processor, to perform actions directed toward communicating feedback in communication systems, the actions comprise receiving data packets from each of a plurality of carriers, deriving an input bit stream indicative of the receipt of the plurality of data packets, utilizing an output block code to convert the input bit stream into an output bit stream, and transmitting the output bit stream to at least one of the plurality of carriers.

In accordance with another aspect of the present invention, a method comprises a step for receiving data packets from each of a plurality of carriers, a step for deriving an input bit stream indicative of the receipt of the plurality of data packets, a step for utilizing an output block code to convert the input bit stream into an output bit stream, and a step for transmitting the output bit stream to at least one of the plurality of carriers.

BRIEF DESCRIPTION OF THE DRAWINGS

The foregoing aspects and other features of the present invention are explained in the following description, taken in connection with the accompanying drawings, wherein:

FIGS. 4(a-c) are block diagrams of examples of the R-ACKCH structure in accordance with embodiments of the invention.

DETAILED DESCRIPTION

An example of the present invention provides for acknowledging an attribute of data packets received over multiple carriers including, but not limited to, receipt/non-receipt, signal quality, and channel quality. This is achieved by employing a block code derived in part from an existing 1×EV-DV block code definition. As used herein "1×EV-DV block code" refers to block code defined in the standards for 1×EV-DV systems, such as at "Physical Layer Standard for cdma2000 Spread Spectrum Systems Release C", 3GPP2 Document No. C.S0002-C V1.0, May 28, 2002 (hereinafter "the standard") which is herein incorporated by reference. As is described more fully below, by eschewing simple repetition in favor of a block code derived from an existing standard, transmission overhead is reduced and error detection is enhanced in comparison to a linear extension of 1×EV-DV to 3×EV-DV. In addition, utilization of an existing 1×Ev-DV standard, such as disclosed in table 2.1.3.1.4.3-1 of the standard, maintains backwards compatibility from a 3×EV-DV system to that of 1×EV-DV.

Figure 2:
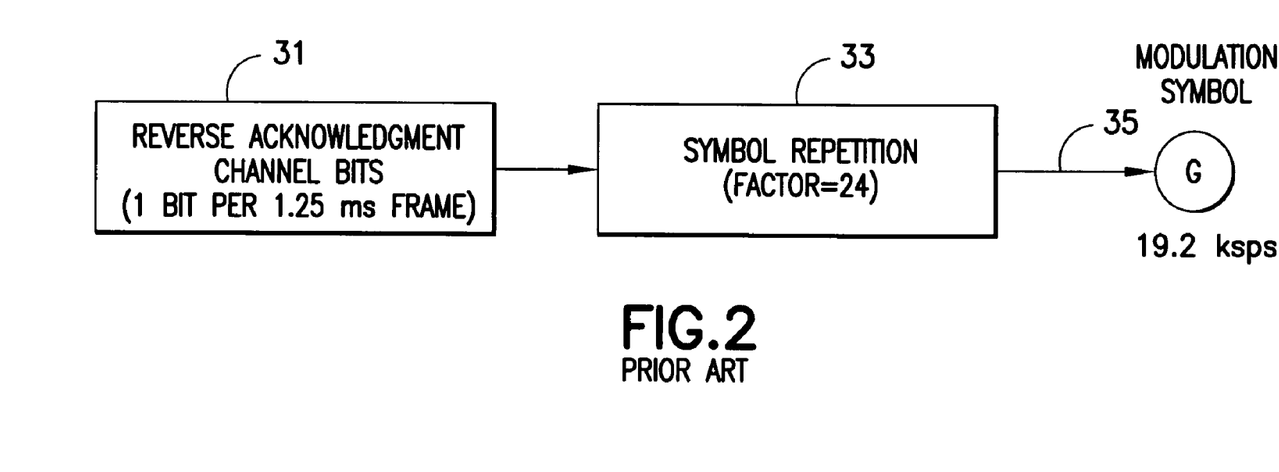
FIG. 2 is a block diagram of the reverse acknowledgement channel (R-ACKCH) structure for a 1×EV-DV system known in the art.

With reference to FIG. 2, there is illustrated the reverse acknowledgement channel (R-ACKCH) as implemented presently in 1×EV-DV systems. The acknowledgements sent on the R-ACKCH at block 31 indicate whether or not a mobile station received a packet correctly. In typical operation, this reverse link ACK/NAK reporting is enabled through the use of a single bit sent by the MS over the R-ACKCH. MSs can include, but are not limited to, cellular telephones, personal digital assistants (PDAs), portable computers, image capture devices such as digital cameras, gaming devices, music storage and playback appliances, Internet appliances permitting Internet access and browsing, as well as portable units or terminals that incorporate combinations of such functions. In order to insure receipt of the acknowledgement, the bit may be repeated numerous times. In the present example the symbol repetition is set to a factor of 24 at step 33. As noted, a straightforward linear extension from 1×EV-DV to 3×EV-DV would involve the tripling of the associated overhead from 24 bits to 72 bits.

In FIG. 2, a single ACK/NACK bit for the single forward link is mapped to a symbol and repetition of the symbol on the reverse link equates to repetition of the ACK/NACK bit.

Figure 6:
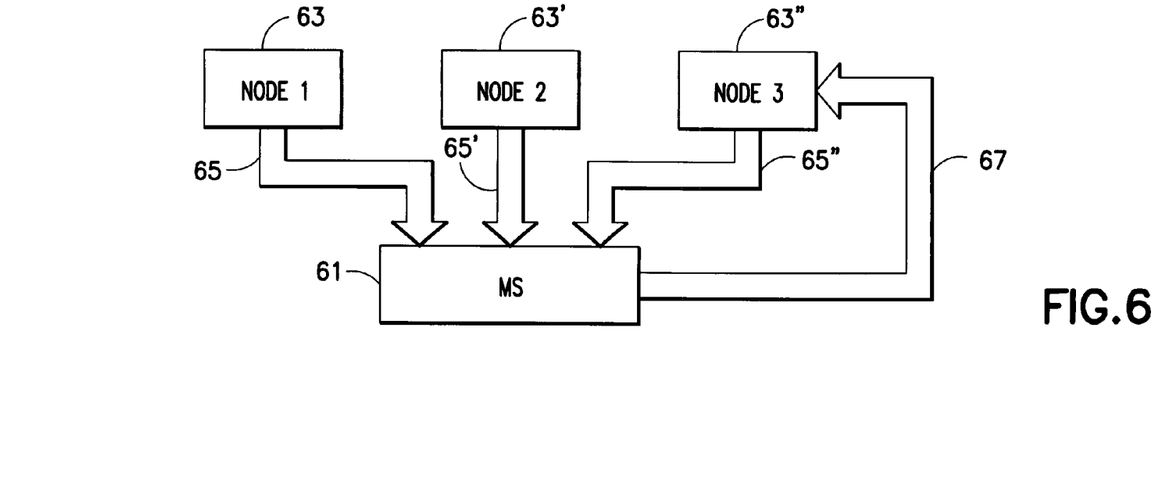
FIG. 6 is a diagram of a single MS in a 3×EV-DV system receiving over three forward links and transmitting over one reverse link.

With reference to FIG. 6 there is illustrated the flow of data from three separate transmit antennas 63, 63', 63" to a mobile station 61 and back via reverse link 67 acting as the R-ACKCH according to the present invention. Data packets are sent by the nodes 63, 63', 63" to the MS 61 via forward links 65, 65', 65". In return, the MS 61 constructs a bit stream consisting of one bit for each node 63 with which the MS 61 is in communication indicating whether or not a data packet sent by one or more nodes 63 was correctly received. For example, the MS 61 may construct a stream of "0,1,1" indicating that a first node's data packet was not received without error while a second and a third node's data packets were received without error.

The information contained in the bit stream forms the basis of the output bit stream that is transmitted by the MS 61 to the nodes 63, 63', 63" via reverse link 67. As will be discussed below, the output bit stream is preferably formed from an output block code, which may or may not be repeated. In a preferred, but non-limiting example, the block code is derived from an existing 1×EV-DV block code. By "derived", it is meant that each output code in the output block code is an output code in the 1×EV-DV block code, but which is associated with a similar, but different, input code.

Figure 3:
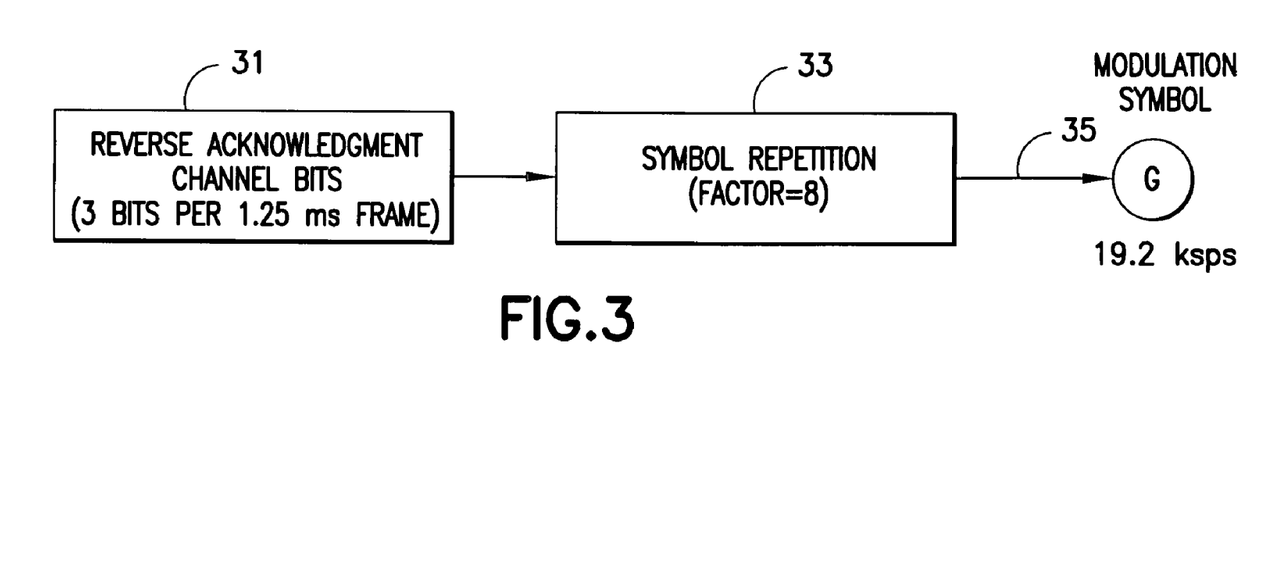
FIG. 3 is a block diagram of the R-ACKCH structure for a 3×EV-DV system according to the present invention.

With reference to FIG. 3, there is illustrated the R-ACKCH as implemented in a 3×EV-DV system resulting from a linear extension of 1×EV-DV. The exemplary depiction shows how to achieve hybrid automatic repeat requests (HARQ) reports for data packets received on each of a multitude of carriers. In the present case, three carriers are assumed. As such, symbol repetition is set to a factor of 8 (24 bits/3 carriers=8 symbols/carrier). The extension of the solution illustrated to the case where, for example, two carriers are enabled on downlink is similar.

Such an implementation of the R-ACKCH in a 3×EV-DV system serves to maintain backwards compatibility with 1×EV-DV systems. One drawback of such a reduced repetition approach (reduced from a factor of 24 to a factor of 8) is the reverse link power overhead required. Specifically, as the bit repetition factor is reduced, more transmit power is required from the MS to maintain reliability.

As noted above, the present invention teaches a method of performing R-ACKCH in a 3×EV-DV system which does not incur a linear increase in overhead as a result of moving from a 1× to a 3× system and which enables R-ACKCH communication in a manner that is more efficient than employing symbol repetition. This is achieved through the implementation of an output block code the use of which enables the MS 61 to acknowledge the receipt/non-receipt of more than one data packet at a time.

In general, use of symbol repetition as discussed above can be thought of as a simple block code. The performance of block codes is directly tied to the minimum Hamming distance amongst all of the codes forming the block code. The Hamming distance of any two codes is equal to the number of positions in bit sequences where the bits of the output codes are different. For example, the two bit sequences '1 0 1 1 0 0 1' and '1 1 0 0 1 0 1' have a Hamming distance of four. For the case of transmitting one bit that is repeated N times as depicted in FIGS. 2 and 3, the Hamming distance is N (Either N 1's or N 0's are the transmission sequence for the two possible cases).

When seeking to insure correct receipt of a coded message, such as a R-ACKCH communication, in an environment where corruption of the message is possible, one desires to use a code block with as large a Hamming distance as possible. The larger the Hamming distance, the greater the likelihood that a corrupted received data stream can be correctly resolved to the originally transmitted message.

Consider, for example a code block formed of four bit output codes, where each output code represents a number between zero and fifteen (binary 0000 and 1111 respectively). Such a block code has a minimum Hamming distance of one. That is to say, each output code differs from its next most similar output code by only one bit. Further consider the transmission by a MS of the code for "7" (0111) which is corrupted by one bit to read "5" (0101). Such a corruption results in the transformation of the originally sent code into another legitimate code sequence. As such, there is no way to determine from the received packet data if the data received is corrupted, and, if so, what the original message was.

As the minimum Hamming distance of a code block increases, so does the accuracy of transmitted data in the presence of corruption. Consider a block code with a minimum Hamming distance of ten. If one bit is corrupted in a received code, the received code differs from a legitimate code by one bit and the next most similar legitimate code by nine bits. It is therefore most probable that the transmitted code was the code which differs by only one bit.

Consider the block code used in defining the 1×EV-DV full C/I report as depicted in Table 1 (table 2.1.3.1.4.3-1 of the standard):

TABLE 1

Codewords for the Reverse Channel Quality Indicator Channel (12, 4) Block Code

| Input | Output |
|---|---|
| '0000' | '0000 0000 0000' |
| '0001' | '0101 0101 0101' |
| '0010' | '0011 0011 0011' |
| '0011' | '0110 0110 0110' |
| '0100' | '1111 0000 1111' |
| '0101' | 1010 0101 1010' |
| '0110' | '1100 0011 1100' |
| '0111' | '1001 0110 1001' |
| '1000' | '0000 1111 1111' |
| '1001' | '0101 1010 1010' |
| '1010' | '0011 1100 1100' |
| '1011' | '0110 1001 1001' |
| '1100' | '1111 1111 0000' |
| '1101' | '1010 1010 0101' |
| '1110' | '1100 1100 0011' |
| '1111' | '1001 1001 0110' |

A block code represents an input bit stream (input code) of length X and an associated output bit stream (output code) of length Y. Block codes may be referred to by the format (Y,X). The block code of Table 1 is therefore a (12,4) block code. Note that the minimum Hamming distance for this block code is six.

Table 2 depicts exemplary code words for the 3×EV-DV HARQ reports using bit repetition coding as defined in FIG. 3:

TABLE 2

Code words for the Reverse Acknowledgement Channel as defined in FIG. 3 (3 bit input denotes 3 carrier reporting).

| Input | Output |
|---|---|
| '000' | '0000 0000 0000 0000 0000 0000' |
| '001' | '0000 0000 0000 0000 1111 1111' |
| '010' | '0000 0000 1111 1111 0000 0000' |
| '011' | '0000 0000 1111 1111 1111 1111' |
| '100' | '1111 1111 0000 0000 0000 0000' |
| '101' | '1111 1111 0000 0000 1111 1111' |
| '110' | '1111 1111 1111 1111 0000 0000' |
| '111' | '1111 1111 1111 1111 1111 1111' |

Specifically, Table 2 shows every possible three-bit combination as an input code and an output code formed from repeating each bit in the input code by a factor of eight. Note that in this case, repetition occurs over a vector of input bits, but does not preclude repetition of each of the input bits individually. Observe that the minimum Hamming distance for this code is eight. Similarly, for two carrier reporting utilizing N=12 repetition, the minimum Hamming distance is twelve. One may denote the three carrier differential reporting code in Table 2 as a (24,3) block code and the two carrier differential reporting code as a (24,2) block code.

The theoretical minimum, hence optimal, Hamming distances for the (24,3) and (24,2) linear codes can be mathematically computed to be thirteen and sixteen, respectively. Therefore, utilization of simple repetition for two and three carrier HARQ reporting as illustrated above is not optimal.

The present invention provides a method for deriving a (24,3) and (24,2) block code for use in HARQ reporting which, in each instance, results in a near optimal or optimal minimum Hamming distance. As used herein, "near optimal" refers to a block code with a minimum Hamming distance less than the theoretically computed optimal Hamming distance but which is greater than is obtained through mere repetition.

While illustrated herein with reference to output block codes having output codes each a multiple of twelve, the examples of the present invention are not so limited. Rather the examples of the invention encompass the derivation of output block codes having output code lengths which are integer multiples of the output code lengths of conventional, e.g., 1×EV-DV block codes.

The derivation proceeds as follows. Denote the 4 bit input sequence used in 1×EV-DV systems and illustrated in Table 1 as $x_1,x_2,x_3,x_4$. The goal is to take the (12,4) linear code and derive an optimal (24,3) linear code that has a minimum Hamming distance of 13 (the computed theoretical limit). For the case of three HARQ reports, one such near optimal code results from selecting the codeword corresponding to a "0" being appended to the three bit HARQ report and repeat it. For example, the corresponding codeword of a three carrier HARQ report of "101" would be '0011 1100 1100 0011 1100 1100', which corresponds to the entry 1010 in Table 1 and which is repeated vector-wise. While the (12,4) code of Table 1 utilized to create the output block code of the present invention is comprised of the code words defined for the reverse channel quality indicator channel for a 1×EV-DV system (a 1×EV-DV block code), any such standard block code may be used that results in an optimal or near optimal output block code.

Table 3 depicts two different near optimal (24,3) linear codes, differentiated by a version number, derived from the (12,4) code defined in Table 1.

TABLE 3

Codewords for the Reverse Acknowledgement Channel for the (24, 3) Block Code (Two near optimal (24, 3) codes derived from the optimal (12, 3) code shown).

| Input | Output | Version |
|---|---|---|
| '000' | '0000 0000 0000 0000 0000 0000' | 1 |
| '000' | '0101 0101 0101 0101 0101 0101' | 2 |
| '001' | '0011 0011 0011 0011 0011 0011' | 1 |
| '001' | '0110 0110 0110 0110 0110 0110' | 2 |
| '010' | '1111 0000 1111 1111 0000 1111' | 1 |
| '010' | '1010 0101 1010 1010 0101 1010' | 2 |
| '011' | '1100 0011 1100 1100 0011 1100' | 1 |
| '011' | '1001 0110 1001 1001 0110 1001' | 2 |
| '100' | '0000 1111 1111 0000 1111 1111' | 1 |
| '100' | '0101 1010 1010 0101 1010 1010' | 2 |
| '101' | '0011 1100 1100 0011 1100 1100' | 1 |
| '101' | '0110 1001 1001 0110 1001 1001' | 2 |
| '110' | '1111 1111 0000 1111 1111 0000' | 1 |
| '110' | '1010 1010 0101 1010 1010 0101' | 2 |
| '111' | '1100 1100 0011 1100 1100 0011' | 1 |
| '111' | '1001 1001 0110 1001 1001 0110' | 2 |

Note that these two (24,3) codes have a minimum Hamming distance of twelve, which is very close to the optimal minimum achievable distance of thirteen and greater than the Hamming distance of eight for the code defined in Table 2. Also note the codes are defined by selecting the input codeword from the (12,4) block code of Table 1 by appending either a "0" or a "1" as $x_4$ to the 3 bit HARQ report to derive an output code (this yields the optimal (12,3) code) and repeating by a factor of 2. Specifically, inputs having a version "1" correspond to appending a "0" as $x_4$ to the 3 bit HARQ report of Table 2. Conversely, inputs having a version "2" correspond to appending a "1" as $x_4$ to the 3 bit HARQ report of Table 2.

A "proper code" is defined as a code that includes the all-zero codeword and the binary addition of any two output codewords result in an output codeword (linearity property). Thus the (24,3) derived from the repeated (12,3) code corresponding to version "1" is the preferred code since it is a proper code.

An optimal (24,2) code can be obtained in a similar fashion. Table 4 depicts four different optimal (24,2) linear codes, versions "1", "2", "3", and "4" respectively, derived from the (12,4) code defined in Table 1.

TABLE 4

Codewords for the Reverse Channel Quality Indicator Channel Di3fferential Reports for the (24, 2) Block Code (Four optimal (24, 2) codes derived from the (12, 2) code shown).

| Input | Output | Version |
|---|---|---|
| '00' | '0000 0000 0000 0000 0000 0000' | 1 |
| '00' | '0101 0101 0101 0101 0101 0101' | 2 |
| '00' | '0011 0011 0011 0011 0011 0011' | 3 |
| '00' | '0110 0110 0110 0110 0110 0110' | 4 |
| '01' | '1111 0000 1111 1111 0000 1111' | 1 |
| '01' | '1010 0101 1010 1010 0101 1010' | 2 |
| '01' | '1100 0011 1100 1100 0011 1100' | 3 |
| '01' | '1001 0110 1001 1001 0110 1001' | 4 |
| '10' | '0000 1111 1111 0000 1111 1111' | 1 |
| '10' | '0101 1010 1010 0101 1010 1010' | 2 |
| '10' | '0011 1100 1100 0011 1100 1100' | 3 |
| '10' | '0110 1001 1001 0110 1001 1001' | 4 |
| '11' | '1111 1111 0000 1111 1111 0000' | 1 |
| '11' | '1010 1010 0101 1010 1010 0101' | 2 |
| '11' | '1100 1100 0011 1100 1100 0011' | 3 |
| '11' | '1001 1001 0110 1001 1001 0110' | 4 |

Note that these four (12,2) codes have a minimum Hamming distance of 16 corresponding to the optimal minimum achievable distance. Also note they are defined by selecting the input codeword from the (12,4) code in Table 1 by appending a "00", "01, "10", or an "11" as $x_3, x_4$ to the 2 bit HARQ report (this yields the optimal (12,2) code) and repeating. The (24,2) code corresponding to version "1" in Table 4 is the preferred code since it is a proper code. It should be noted that the (24,2) code is composed of a repetition of the optimal (12,2) code.

The advantages of the (24,3) and (24,2) output block codes are several. They are either optimal (as in the (24,2) case) or near optimal (as in the (24,3) case) and exhibit improved Eb/No performance when compared to using only repetition. Further, they may be derived from a pre-existing code library already in use in existing 1×EV-DV systems, thus simplifying implementation.

Figures 4, 4C:
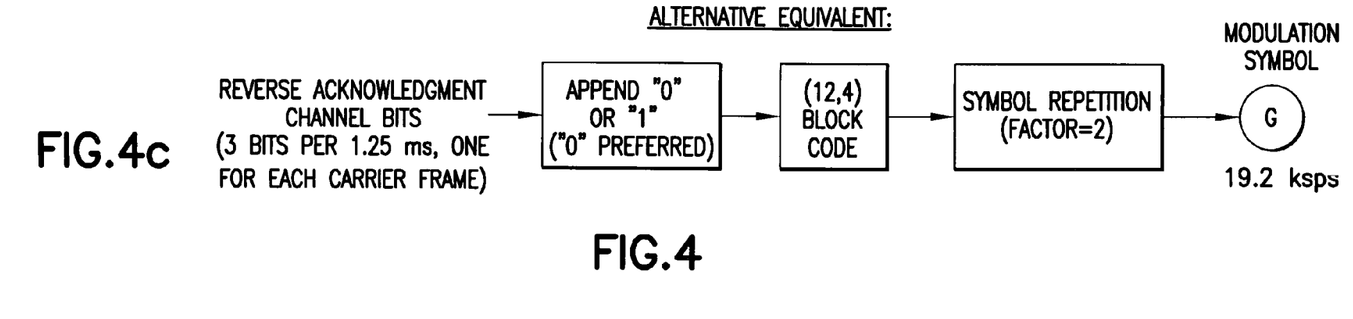
Figure 4A:
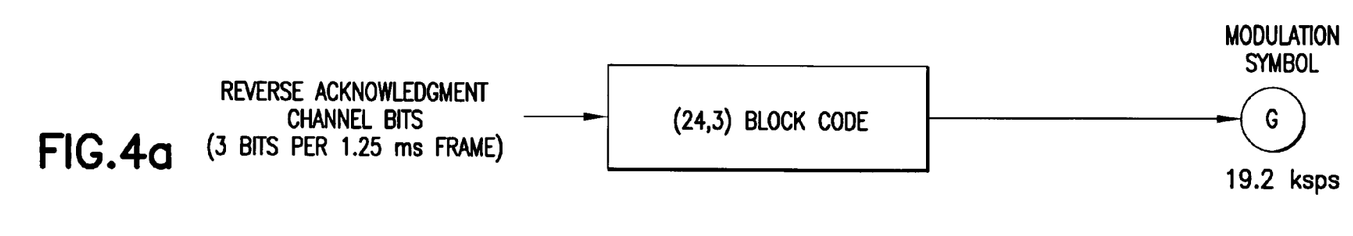
Figure 4B:
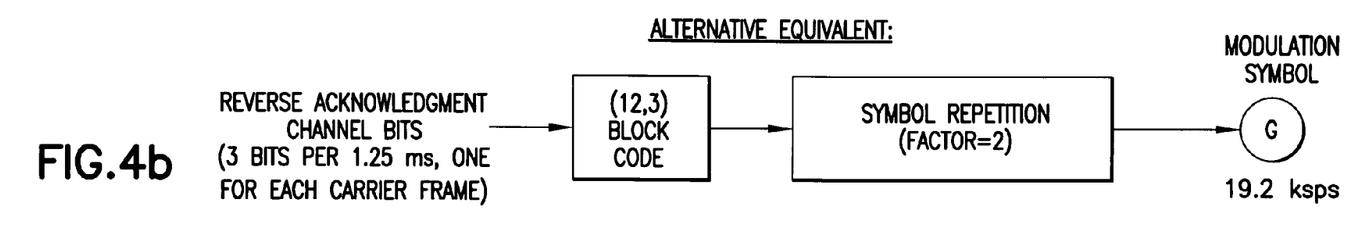

With reference to FIG. 4, there are illustrated three examples depicting the R-ACKCH channel structure for three carrier HARQ reporting making use of the near optimal (24, 3) linear code. With reference to FIG. 4a, there is illustrated an example wherein the three reverse acknowledgement channel bits are communicated via the near optimal (24,3) block code of Table 2. With reference to FIG. 4b, there is illustrated an alternative example wherein the three reverse acknowledgement channel bits are communicated via an optimal (12,3) block code repeated by a factor of two. Lastly, with reference to FIG. 4c, there is illustrated an alternative example wherein there is appended either a "0" or a "1" to the three reverse acknowledgement channel bits to produce an input to the (12,4) block code of Table 1, whereby the (12,4) block code output is transmitted using a repetition factor of two. It is further evident that FIG. 4 can be modified to incorporate the optimal (12,2) linear code for two carrier HARQ reporting. Note that repetition of the output can be done bitwise or any other pattern, not only vectorwise as illustrated in FIGS. 3 and 4.

Figure 5:
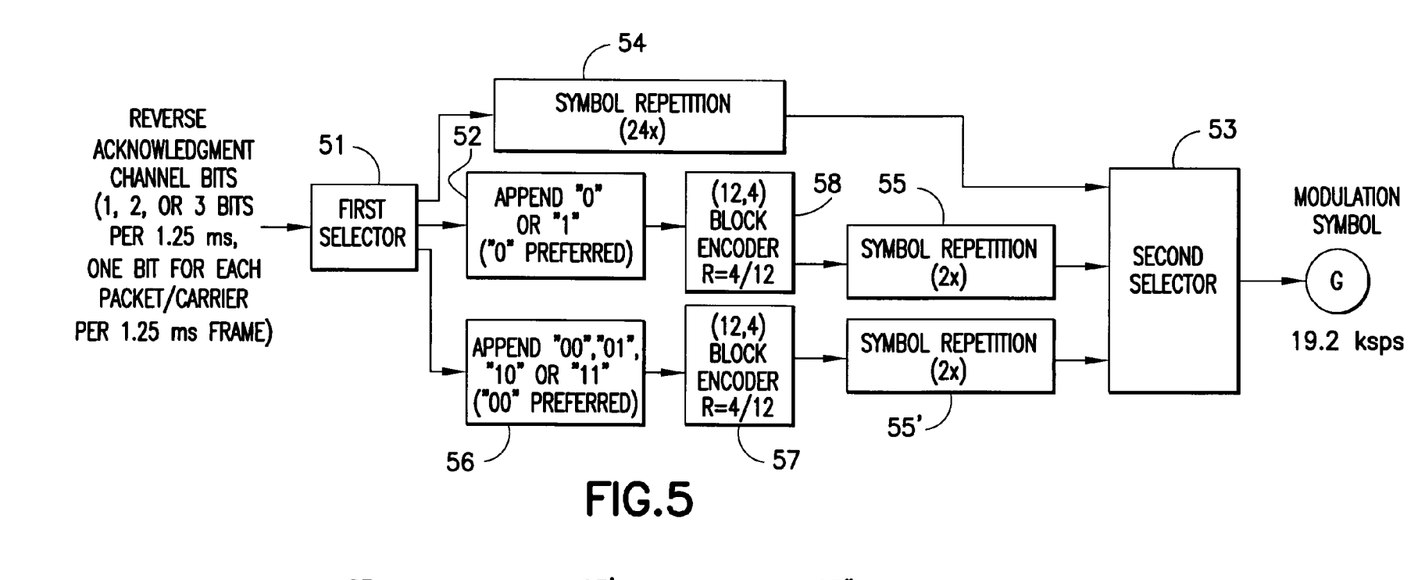
FIG. 5 is a block diagram of an R-ACKCH structure for HARQ reporting over one or more carriers according to embodiments of the invention.

With reference to FIG. 5, there is illustrated a block diagram of a logical structure for handling HARQ reporting in the 1, 2, and 3 bit input scenarios. A first selector 51 serves to decide which block code methodology will be employed based upon the number of input reverse acknowledgement channel bits. If the number of input bits is one, the input bit is repeated a total of twenty-four times (block 54). If the number of input bits is three, a "0" or a "1" ("0" preferred) is appended to the input code (block 52) to derive the output of the optimal (12,4) block code (block 58) which is then communicated with a repeat factor of two (block 55). Lastly, If the number of input bits is two, a "00", "01", "10", or "11" ("00" preferred) is appended to the input code (block 56) to derive the output of the optimal (12,4) block code (block 57) which is then communicated with a repeat factor of two (block 55'). A second selector 53 then communicates the appropriate output bit stream via the reverse link.

In an alternative example of the present invention, use of the 1×EV-DV block code of Table 1 can be utilized to allow a MS to report on the channel quality of a multitude of carriers. As before, the extension from transmitting information over a reverse link in a 1×EV-DV system to a 3×EV-DV scenario is accomplished without tripling the overhead.

In present 1×EV-DV systems, MSs report pilot strengths, e.g. C/I, to the network in which they operate. The design of the 1×EV-DV reverse channel quality channel (R-CQICH) allows the MS to perform fast reporting of the best-received pilot strength and identify the source of the best pilot with a sector specific Walsh cover. The fast reporting can be accomplished in two different ways: 1) Full rate mode which consists of reporting the C/I every 20 ms with differential reports every 1.25 ms in between full reports, or 2) Reduced rate mode which consists of the C/I being repeated over multiple 1.25 ms intervals, and differential C/I updates sent over the remaining 1.25 ms slots in each 20 ms period. This scheme works quite well for the single carrier case experienced in 1×EV-DV systems. The present invention provides a method for extending R-CQICH reporting to 3×EV-DV systems without a linear expansion in overhead.

Consider the periodic full C/I report made for 1×EV-DV and its application/extension to the 3× multi-carrier case. It is very likely the channel fading is highly correlated in the 3× multi-carrier case since the assumed downlink bandwidth of 5 Mhz is smaller than the channel coherence bandwidth. Hence the full C/I report can be derived as the average of the carriers' corresponding C/I's. Just performing this extension (average C/I reporting) would achieve backwards compatibility assuming nothing else was changed in the design. Stated another way, the differential reports would provide differential updates to the average received C/I observed by the MS. However, this approach does not make use of the differential data available for each individual carrier.

The best approach to facilitate more aggressive scheduling on the forward link would be to incorporate C/I reporting for each carrier, but this would create three times the overhead in the reverse link thus reducing the usable reverse link data carrying capacity. A more efficient approach would be to report the average C/I coupled with differential reports where each differential update reflects the deviation of the received signal strength for each carrier with respect to the average received signal strength.

Figure 7:
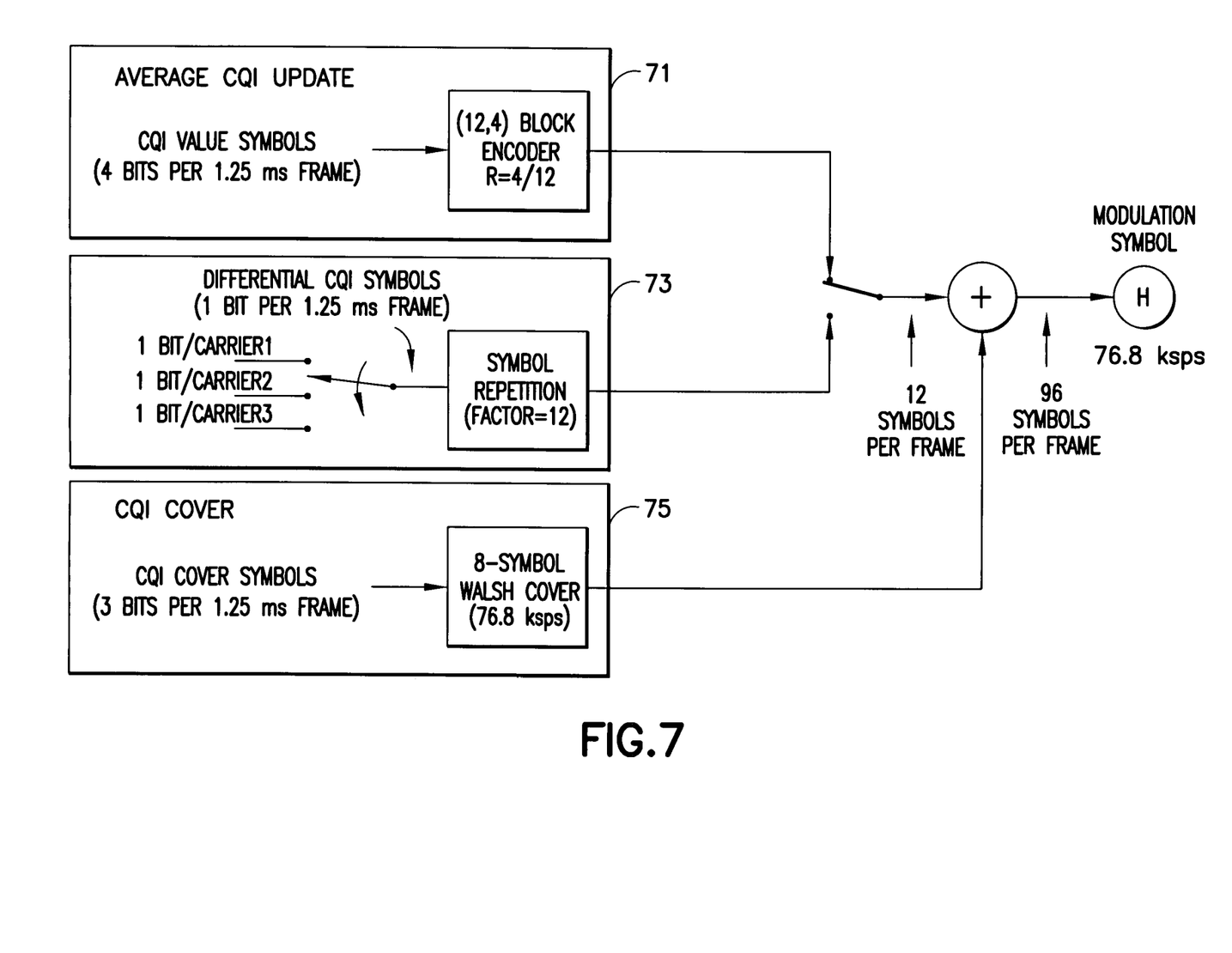
FIG. 7 is a block diagram CQICH structure for handling one or more carrier channel quality reporting according to embodiments of the invention.

With reference to FIG. 7, there is illustrated an example for achieving differential C/I reports for each carrier with respect to the average received C/I at the MS according to the present invention. The Average CQI Update 71 is typically a four bit number representing a level from zero to fifteen corresponding to the instantaneous average channel quality amongst all of the carriers in communication with the mobile station. The Average CQI Update is periodically transmitted from the MS to one or more carriers via the reverse link. The Differential CQI 73 Update is a string of one, two, or three bits corresponding to the number of carriers with which the MS is in contact in a 3×EV-DV system.

The telecommunications system assigns specific CQI covers for each sector or cell within the telecommunications system. The CQI cover is used by the mobile station to inform the network for which sector or cell of the telecommunications system the CQI report is valid. The CQI cover also indicates to the telecommunications network which sector or cell the mobile station prefers to receive downlink transmissions from the telecommunications system.

Figure 8:
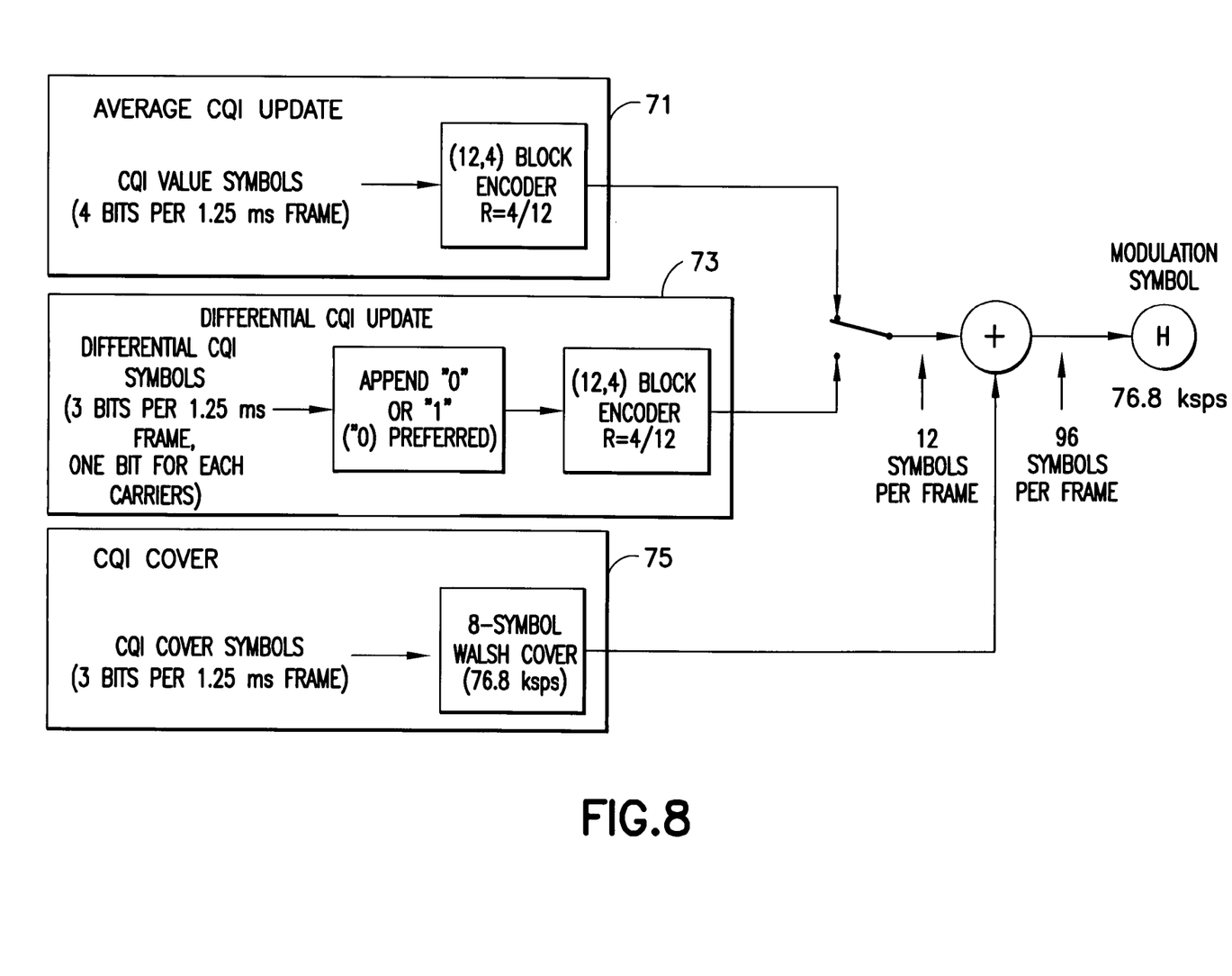
FIG. 8 is a block diagram of an alternative example of the CQICH structure for handling one or more carrier channel quality reporting according to embodiments of the invention.
Figure 9:
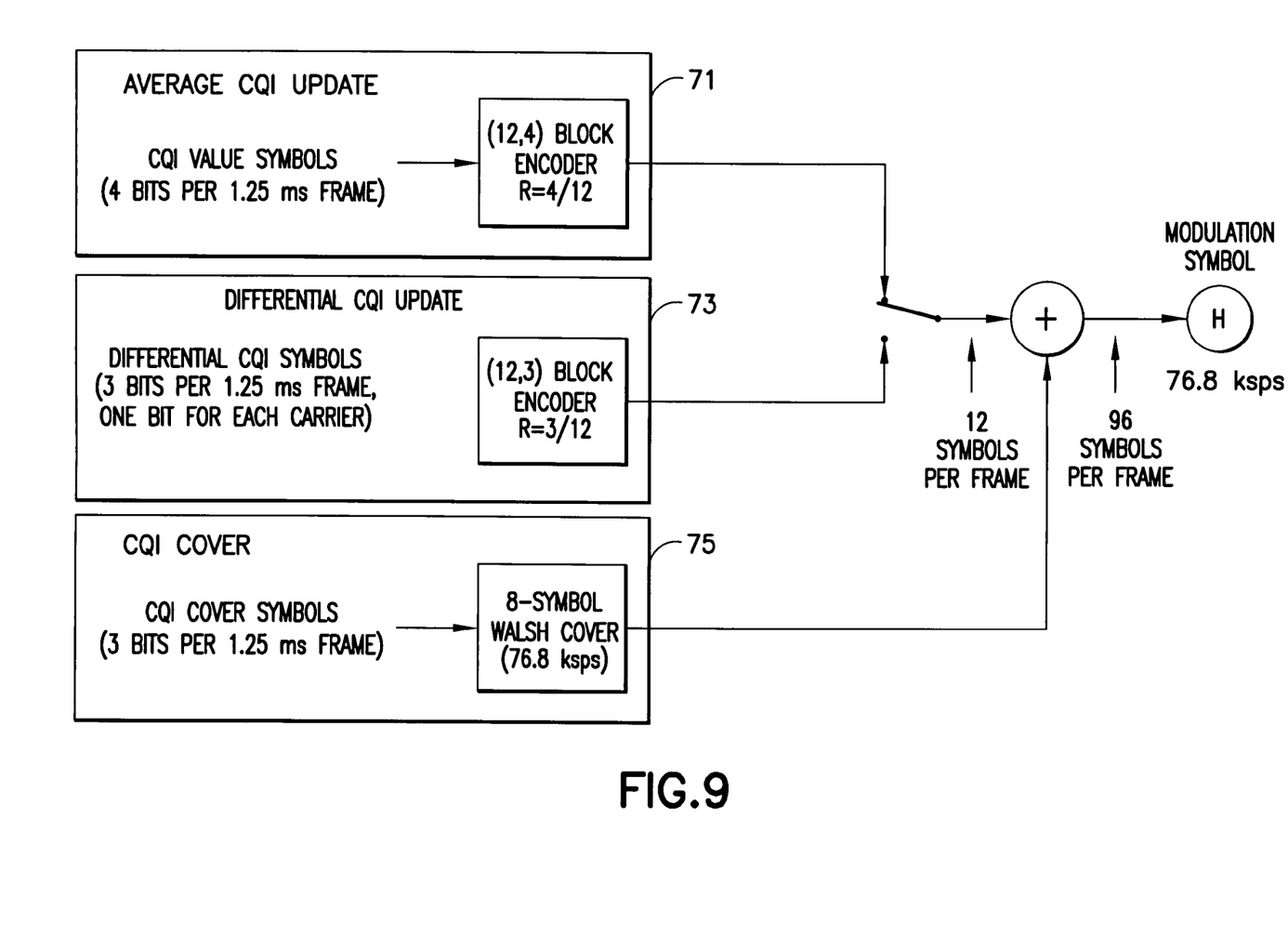
FIG. 9 is a block diagram of an alternative example of the CQICH structure for handling one or more carrier channel quality reporting according to embodiments of the invention.

With reference to FIG. 8, there is illustrated another example of the present invention. In the present example, the Differential CQI Update for a three carrier scenario is formed by appending a "0" or a "1" to a three bit symbol and utilizing a (12,4) block code as described above. With reference to FIG. 9, there is illustrated an example wherein the Differential CQI Update for a three carrier scenario is formed from a three bit symbol and is transmitted using a (12,3) block code as described above.

Figure 10:
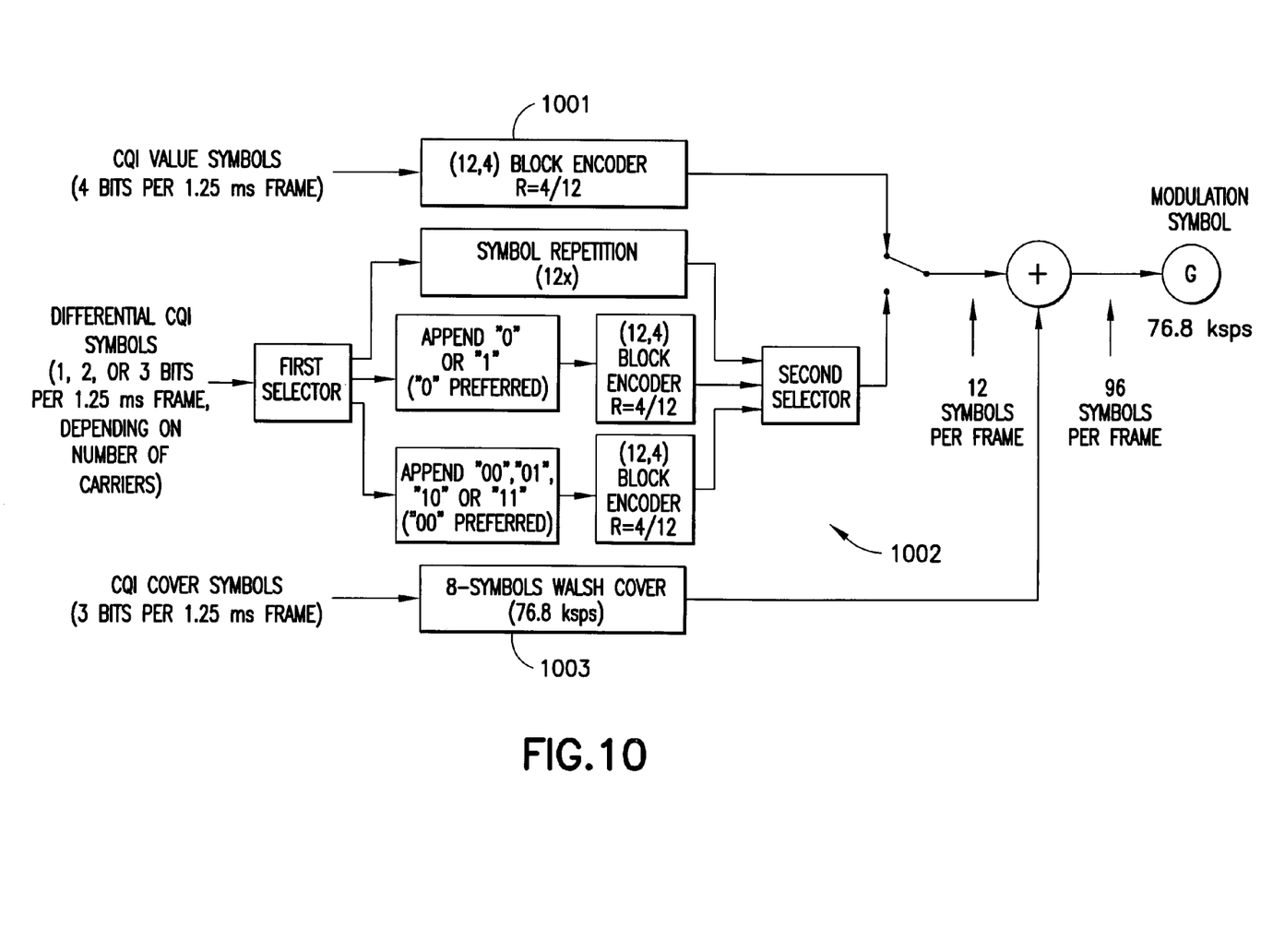
FIG. 10 is a block diagram of an example of the R-CQICH structure for handling one or more carrier C/I reporting according to embodiments of the invention.

With reference to FIG. 10, there is illustrated a diagram of an example wherein differential C/I reporting is achieved for each of one or more carriers with respect to the average received C/I at the MS according to the present invention. In the instance that the Differential CQI symbol is formed of a single bit, the Differential CQI symbol is transmitted with a symbol repetition of twelve. If the Differential CQI symbol is formed of more than one bit, bits are appended to the Differential CQI symbol as described above so as to facilitate the transmission of the Differential CQI Update using a (12,4) block code.

In between transmission of the Average CQI Update 1001, one or more Differential CQI Updates are sent by the MS to indicate, for each carrier, whether the carrier's signal strength has increased (bit equal to "1") or decreased (bit equal to "0"). For example, the bit sequence "0, 1, 1" indicates that the signal quality of a first carrier has decreased while that of the two remaining carriers has increased. While illustrated with a bit value of "1" indicating an increase in strength and a bit value of "0" indicating a decrease in signal strength, the values could in practice be reversed.

Differential CQI Updates 1002 consisting of two, or three, can be sent at any desired interval using the optimal (12,4) block code of Table 1 to derive an optimal or near optimal output block code for producing an output bit stream to be transmitted to one or more carriers in a manner similar to that described above with reference to R-ACKCH communication. As before, a repetition factor may be utilized as desired. Average CQI Updates consisting of four bits can be transmitted using the optimal (12,4) block code of Table 1 without the need for appending a one or two digit bit code to the input code so as to derive an output block code.

As described herein, each MS is configured to operate as an element in a multi-carrier wireless network such that it is capable of receiving data packets from one or more carriers, creating any of a multitude of input bit streams containing data, utilizing a block code to convert the input bit streams into at least one output bit stream, and transmitting the output bit stream. Similarly, each carrier is capable of receiving and decoding the transmitted output stream to obtain the original input bit stream. As noted, because existing MSs and carriers presently perform operations involving the 1×EV-DV block code of Table 1, the carriers are able to efficiently perform such decoding. In many cases, specialized hardware in each carrier is devoted to such decoding.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method comprising:
   receiving at a wireless receiver at least one data packet from each of a plurality of carriers in a wireless communications system wherein communication operations are performed between users;
   deriving an input bit stream indicative of an attribute of said at least one data packet from each of said plurality of carriers, wherein the input bit stream comprises information to be used in controlling communication operations involving at least one user of the wireless communications system;
   deriving an output block code from a first block code, wherein deriving means selecting output codes from the first block code, wherein the output codes are each respectively associated with a particular input code, and assigning the output codes from the first block code to different input codes to generate the output block code;
   utilizing the output block code to convert said input bit stream into an output bit stream; and
   transmitting said output bit stream to at least one of said plurality of carriers.

2. The method of claim 1 wherein said input bit stream comprises a plurality of bits each indicative of a receipt/non-receipt of said at least one data packet.

3. The method of claim 1 wherein said input bit stream comprises a plurality of bits each indicative of a signal quality of an individual one of said plurality of carriers.

4. The method of claim 1 wherein said first block code comprises a 1×EV-DV block code.

5. The method of claim 4 wherein said 1×EV-DV block code comprises a full carrier to interference ratio (C/I) report block code.

6. The method of claim 4 wherein said 1×EV-DV block code comprises a (12, 4) block code.

7. The method of claim 4 wherein said at least one data packet comprises two data packets and said output block code comprises a (12, 2) block code.

8. The method of claim 7 wherein said output block code is transmitted with a repetition factor of two.

9. The method of claim 7 wherein said output block code is near optimal.

10. The method of claim 4 wherein deriving an output block code further comprises:

appending a two digit bit stream to each of a plurality of input codes of said output block code to form a plurality of appended input codes;

retrieving an output code of said first block code corresponding to each of said plurality of appended output codes; and associating each retrieved output code with its associated input code to derive said output block code.

11. The method of claim 10 wherein said two digit bit stream is equal to "00".

12. The method of claim 4 wherein said at least one data packet comprises three data packets and said output block code comprises a (12, 3) block code.

13. The method of claim 12 wherein said output block code is transmitted with a repetition factor of two.

14. The method of claim 12 wherein said output block code is near optimal.

15. The method of claim 4 wherein deriving an output block code further comprises:

appending a bit to each of a plurality of input codes of said output block code to form a plurality of appended input codes;

retrieving an output code from said first block code corresponding to each of said plurality of appended output codes; and associating each retrieved output code with its associated input code to derive said output block code.

16. The method of claim 15 wherein said bit is equal to "0".

17. An apparatus comprising:

a signal processor configured to be coupled to a receiver that is configured to receive a plurality of data packets over a plurality of carriers, said signal processor configured to derive an input bit stream indicative of an attribute of said plurality of data packets, wherein the input bit stream comprises information to be used in controlling communication operations in the wireless communications system involving the apparatus; to derive an output block code from a first block code, wherein to derive means to select output codes from the first block code, wherein the output codes are each respectively associated with a particular input code, and to assign the output codes from the first block code to different input codes to generate the output block code; to utilize the output block code to convert said input bit stream into an output bit stream; and to send the output bit stream to a transmitter that is configured to transmit said output bit stream to said plurality of carriers.

18. The apparatus of claim 17 wherein said apparatus comprises at least one of a cellular telephone, a personal digital assistant (PDA), a portable computer, an image capture device such as a digital camera, a gaming device, a music storage and playback appliance, and an Internet appliance permitting Internet access and browsing.

19. The apparatus of claim 17 wherein said first block code is a 1×EV-DV block code.

20. The apparatus of claim 19 wherein said 1×EV-DV block code comprises a full C/I report block code.

21. The apparatus of claim 19 wherein said 1×EV-DV block code is a (12,4) block code.

22. The apparatus of claim 17 wherein said output block code is optimal.

23. The apparatus of claim 17 wherein said output block code is near optimal.

24. The apparatus of claim 17 wherein said input bit stream comprises a plurality of bits each indicative of a receipt/non-receipt of a unique one of said plurality of data packets.

25. The apparatus of claim 17 wherein said input bit stream comprises a plurality of bits each indicative of a signal quality of a unique one of said plurality of data packets.

26. An apparatus configured for use in an electronic device, the electronic device configured to perform communication operations for a user in a wireless communications system, the apparatus comprising:

a signal processor configured to be coupled to a receiver that is configured to receive a plurality of data packets, said signal processor configured to derive an input bit stream indicative of an attribute of said plurality of data packets, wherein the input bit stream comprises information to be used in controlling communications operations in the wireless communications system involving the electronic device; to derive an output block code from a first block code, wherein to derive means to select output codes from the first block code, wherein the output codes are each respectively associated with a particular input code, and to assign the output codes from the first block code to different input codes to generate the output block code; and to utilize the output block code to convert said input bit stream into an output bit stream for transmission from a transmitter.

27. The apparatus of claim 26 wherein said first block code is a 1×EV-DV block code.

28. The apparatus of claim 27 wherein said 1×EV-DV block code comprises a full C/I report block code.

29. The apparatus of claim 27 wherein said 1×EV-DV block code is a (12,4) block code.

30. The apparatus of claim 26 wherein said output block code is optimal.

31. The apparatus of claim 26 wherein said output block code is near optimal.

32. A mobile station configured to perform communications operations in a wireless communications system, the mobile station comprising:

means for receiving at least one data packet from each of a plurality of carriers;

means for deriving an input bit stream indicative of an attribute of said plurality of data packets, wherein the input bit stream comprises information to be used in controlling communication operations in the wireless communications system involving the mobile station;

means for utilizing an output block code to convert said input bit stream into an output bit stream; and means for transmitting said output bit stream to at least one of said plurality of carriers where said output block code is derived from a first block code, and wherein derived means selecting output codes from the first block code, wherein the output codes are each respectively associated with a particular input code, and assigning the output codes from the first block code to different input codes to generate the output block code.

33. The mobile station of claim 32 wherein said first block code is a 1×EV-DV block code.

\* \* \* \* \*